(12) United States Patent
Tiruvaipeta et al.

(10) Patent No.: US 11,477,190 B2
(45) Date of Patent: Oct. 18, 2022

(54) DYNAMIC USER ID

(71) Applicant: salesforce.com, inc., San Francisco, CA (US)

(72) Inventors: Vinay Kumar Tiruvaipeta, Hyderabad (IN); Chandra Sekhar Varanasi, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 190 days.

(21) Appl. No.: 16/400,192

(22) Filed: May 1, 2019

(65) Prior Publication Data
US 2020/0351263 A1    Nov. 5, 2020

(51) Int. Cl.
*G06F 21/00* (2013.01)
*H04L 9/40* (2022.01)

(52) U.S. Cl.
CPC ...... *H04L 63/0853* (2013.01); *H04L 63/0876* (2013.01)

(58) Field of Classification Search
CPC ................... H04L 63/0853; H04L 63/0876
See application file for complete search history.

(56) References Cited

U.S. PATENT DOCUMENTS

| | | | |
|---|---|---|---|
| 2006/0218625 A1* | 9/2006 | Pearson | H04L 63/0815 726/4 |
| 2013/0145148 A1* | 6/2013 | Shablygin | H04L 63/0853 713/155 |
| 2014/0282961 A1* | 9/2014 | Dorfman | H04L 63/0861 726/7 |
| 2015/0163216 A1* | 6/2015 | Xu | H04L 63/08 726/6 |
| 2015/0222435 A1* | 8/2015 | Lea | H04L 63/0823 713/155 |
| 2017/0163647 A1* | 6/2017 | Cernoch | G06F 21/44 |
| 2017/0257358 A1* | 9/2017 | Ebrahimi | H04L 9/3247 |
| 2017/0339163 A1* | 11/2017 | Alhothaily | H04L 63/0428 |
| 2019/0044943 A1* | 2/2019 | Kim | H04L 63/0281 |
| 2019/0305964 A1* | 10/2019 | Hamel | H04L 9/3218 |
| 2019/0363886 A1* | 11/2019 | Atwood | H04W 12/06 |
| 2020/0042684 A1* | 2/2020 | Gehrmann | H04L 63/0807 |
| 2020/0067904 A1* | 2/2020 | Hugot | H04L 63/0807 |
| 2020/0112436 A1* | 4/2020 | Kanukollu | H04L 9/3213 |

* cited by examiner

*Primary Examiner* — Khoi V Le
*Assistant Examiner* — Michael M Lee
(74) *Attorney, Agent, or Firm* — Butzel Long; Donald J. Lecher

(57) ABSTRACT

The disclosed subject matter provides authentication between a client device and a server. The server allocates a dynamic user ID contained within an authentication token that is provided to the client device. In response to each successful authentication with the server, a new dynamic user ID is generated and provided to the client device for use in a subsequent authentication session. In generating the new dynamic user ID for the client device, the server invalidates any previously-provided dynamic user IDs for the client device.

20 Claims, 4 Drawing Sheets

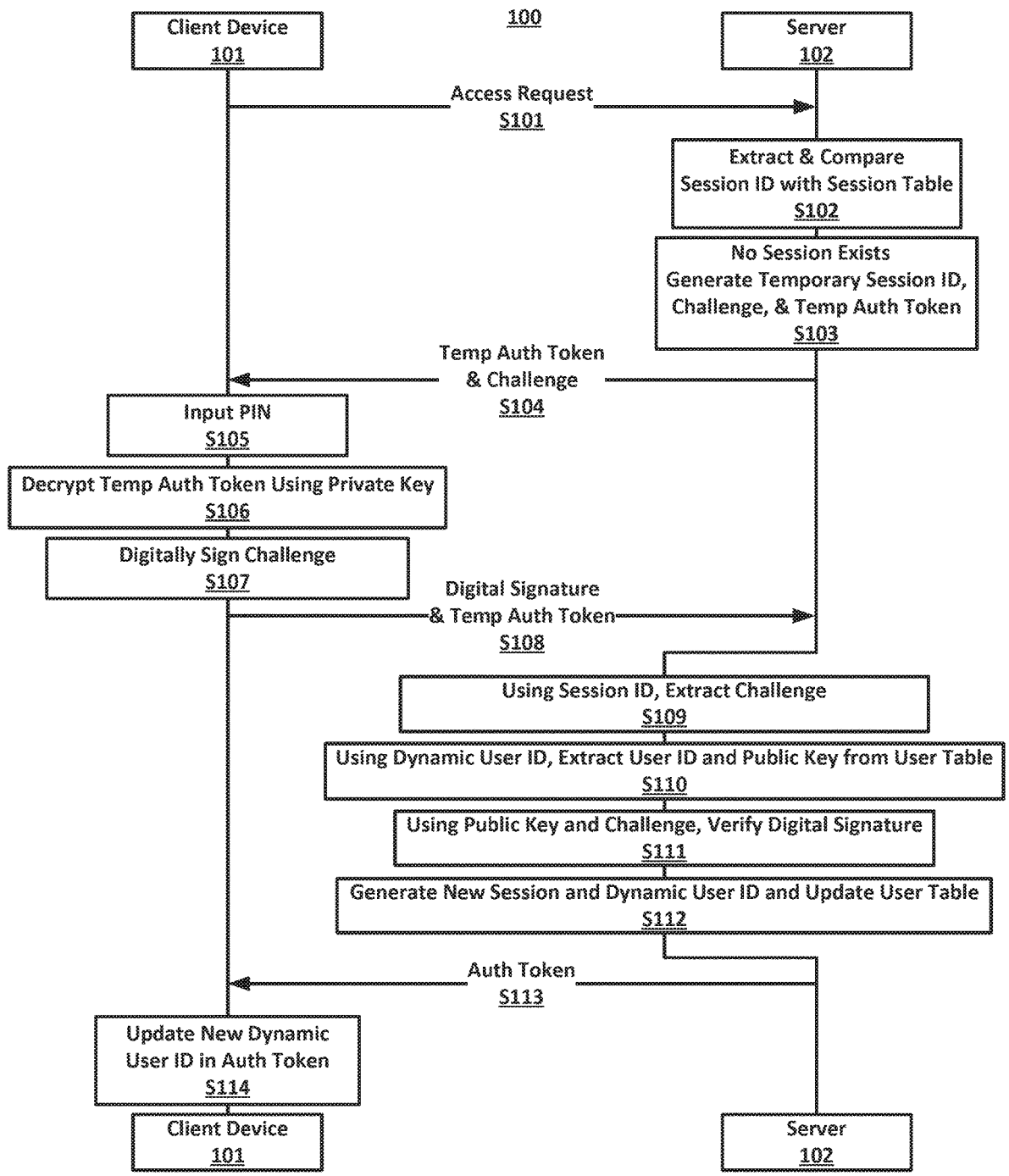

FIG. 2A

Authentication Token 200

| Dynamic User ID 205 | Token Info 210 | Time Stamp 215 |

Session ID 220

FIG. 2B

User Table 250

| Row ID | User Name | User ID 251 | Dynamic User ID | E-Mail ID 253 | Public Key 252 |
|---|---|---|---|---|---|
| 1 | Tejaswini | Teju01 | md81-83gh7db02bc3 | Teju01 | 00301fac84aa |
| 2 | Manaswini | Manu03 | a067-fdeea0c12ff2c | Manu03 | 5a56226da85c |
| 3 | Vinay | Vinay09 | 90bd-7048616a3e81 | Vinay09 | 84894850d7d6 |
| 4 | Kiran | Kiran34 | be42-0dde4feaa077 | Kiran34 | 82d881bbdc99 |

Session Table 260

| Row ID | Session ID 261 | Session Type 262 | Time Stamp | Session Info | Dynamic User ID |
|---|---|---|---|---|---|
| 1 | 81ea-84fd6ca91add | TEMP | 05122017 20:33:42.15 | abc123 | md81-83gh7db02bc3 |
| 2 | a1z1-7f4bea4f0085 | PERM | 05122017 20:30:56.10 | def456 | a067-fdeea0c12ff2c |
| 3 | aab3-ffb36808780d | TEMP | 05122017 20:22:21.59 | ghi789 | 90bd-7048616a3e81 |
| 4 | 9082-f70356c8d7f1 | PERM | 05122017 20:21:52.45 | jkl012 | be42-0dde4feaa077 |

DYNAMIC USER ID

BACKGROUND

Computer systems commonly employ security schemes where a user identifies him/herself to the computer system by entering a user identification, or user ID. The user ID may be the same as the user's associated e-mail address, instant messaging handle, or otherwise made available to others for use in communicating with the associated user. A user that enters his or her user ID when logging in to a computer system generally supplies a password that only the user knows either because it was either chosen by the user or determined elsewhere and communicated privately to the user.

A malicious actor that knows a specific user's user ID may attempt to gain unauthorized access to the user's account. One method employed to gain unauthorized access may be a brute-force attack, where the malicious actor attempts to guess the user's password by repeatedly trying different character combinations until the correct password is guess. A commonly-employed computer security measure to reduce the risk of a successful brute-force attack is to "lock" a user's account for a period of time after his or her password has been entered incorrectly a predetermined number of times. While this technique may stop the malicious actor from making continued attempts to guess the password, it also causes a denial-of-service (DoS) for the genuine user who wants to log-in.

Additionally, a computer security system may detect the malicious actor's origination internet protocol (IP) address and blacklist future log-in attempts from the detected IP address. This security technique also falls short where the malicious actor employs a distributed denial-of-service (DDoS) attack from several machines having different IP addresses.

BRIEF SUMMARY

According to embodiments of the disclosed subject matter, a method of authenticating a client device with a server includes receiving a first authentication request from a first client device and generating a first authentication token. The first authentication token includes a first dynamic user ID, a first session ID, and a first time stamp. The method further includes transmitting the first authentication token to the first client device and receiving a digital signature and a second authentication token from the first client device. The second authentication token includes the first dynamic user ID, the first session ID, and a second time stamp. The method further includes verifying the digital signature based on the contents of the second authentication token, generating a second dynamic user ID, transmitting the second dynamic user ID and a third authentication token to the first client device. The method further includes receiving the second dynamic user ID and the third authentication token from the first client device in a second authentication request occurring after the first authentication request and authenticating the first client device using the third authentication token. The first authentication request includes a fourth authentication token. The method further includes extracting a second session ID from the fourth authentication token and determining whether a valid session for the first client device exists based on the second session ID. The fourth authentication token contains a third dynamic user ID having a null or empty value. The first and second dynamic user ID, when generated, are uniquely assigned to a static user ID such that no other static user ID may be assigned to the same dynamic user ID. The method further includes generating a third session ID that is assigned to the second dynamic user ID. The second dynamic user ID is transmitted within the third authentication token. The third dynamic user ID is transmitted separately from the third authentication token. The method further includes determining that a valid session for the first client device does not exist, generating a challenge, generating a third session ID, and transmitting the challenge to the client device. The method further includes rejecting authentication of a second client device in response to receiving an authentication token containing the first dynamic user ID after generating the second dynamic user ID. The second client device may be the first client device.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 illustrates a flow diagram of a method according to an embodiment of the disclosed subject matter.

FIG. 2A illustrates an example authentication token according to an embodiment of the disclosed subject matter.

FIG. 2B illustrates an example user table and session table according to an embodiment of the disclosed subject matter.

DETAILED DESCRIPTION

Figure 3:
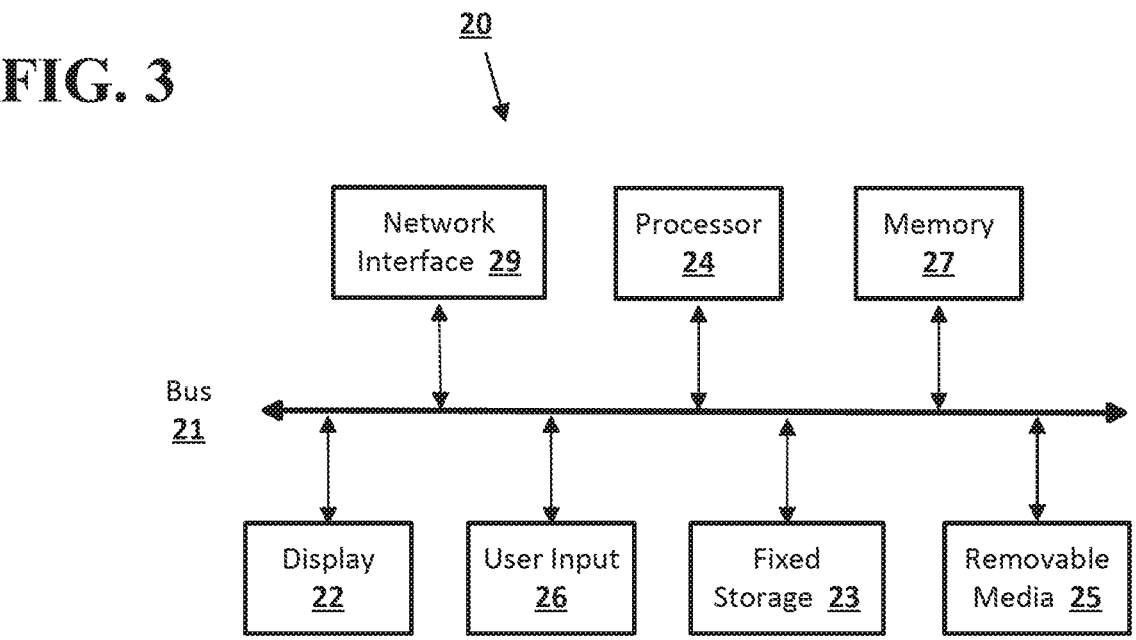
FIG. 3 shows a computing device according to an embodiment of the disclosed subject matter.

The present subject matter discloses an authentication security framework that may be particularly applicable to zero trust environments, i.e., environments in which it is undesirable to trust a user as being non-malicious even after the user gains initial access to a system via conventional identification and/or authentication techniques. The disclosed authentication security framework may provide a secure and positive alternative to centralized and proprietary monolithic trust providers, such as Active Directory, commercial certificate authorities, and the certificate-backed cryptosystems that rely on them.

In an embodiment, a dynamic user ID 205 for a user may be generated for a log-in session. After a successful log-in for the first time, based on entry of a conventional user ID by the user, the dynamic user ID 205 may be generated by a security and/or authentication system as disclosed herein and provided to the user. For each of one or more subsequent log-in sessions, the user may only input a PIN to unlock his or her private key and authenticate the user to the system using the previously-provided dynamic user ID 205. No user ID or password may be needed. A new dynamic user ID 205 may be issued to the user following each successful log-in and may replace the previously-used dynamic user ID. In this way, a malicious actor may never learn of the user's dynamic user ID 205 and cannot inconvenience the user with brute-force or DoS/DDoS attacks. The dynamic user ID 205 may be stored within a user authentication token that is secured via the user's PIN, password, or similar component.

FIG. 1 is a flow diagram illustrating an example of a method 100 for authenticating a client device 101 with a server 102. The method 100 may begin when a user operating a client device 101 submits an access request to server 102 in SIOI. The access request may be made via a web browser operating on the client device 101. The request may include an authentication token 200, as shown in FIG. 2. Where the client device 101 has not previously authenticated with server 102, an authentication token 200 may not be transmitted at all. When transmitted, the authentication token 200, as shown in FIG. 2, may contain a dynamic user ID 205, token info 210, and time stamp 215 components. Alternatively, where the client device 101 has not previously authenticated with server 102, the authentication token 200 may nevertheless be transmitted, but the dynamic user ID 205 may be null or empty. The server 102 may receive the access request. In response to receiving the access request, server 102 may perform an authentication process with client device 101 according to conventional methods known in the art. Server 102 may determine whether the authentication token 200 has been received. If so, server 102 may extract a session ID 220 from a token information component 210 within authentication token 200. In addition to the session ID 220, the token information component 210 may store other attributes, depending on the security protocol implementation. The server 102 may compare the extracted session ID 220 with a session ID 261 stored in session table 260 in S102 to determine whether a valid session for the user and/or client device 101 already exists. The session table 260 may be stored within the server 102 or elsewhere. It should be appreciated that the session table 260 may be implemented using a variety of data storage structures and need not be represented as a table. If a valid session ID 261 for the user and/or client device 101 already exists, the server 102 may allow access for the client device 101 without further processing.

Upon determining that a valid session for the user does not exist or where the authentication token 200 was not received, the server 102 may generate a challenge and a temporary authentication token 200 having a temporary session ID 220 and temporary dynamic user ID 205 in S103. The temporary authentication token 200 may be encrypted using a public key 252 associated with the user of client device 101. The temporary session ID 261 may be stored within session table 260 along with a session type 262 that may identify the session as temporary. Server 102 may then transmit the temporary authentication token 200 and the challenge to the client device 101 in S104. The challenge may be implemented in a variety of ways, such as using a random string, and may not be presented to the user directly. Rather, the challenge may be processed transparently. The client device 101 may subsequently display a login page to the user within the web browser in response to receiving the temporary authentication token 200 and challenge from server 102. The login page may prompt the user of client device 101 to input a personal identification number (PIN).

In S105, the user may enter his or her PIN via client device 101. Upon correct entry of the user's PIN, the user's private key may be used to decrypt the temporary authentication token 200 and extract the dynamic user ID 205 in S106. The PIN may consist solely of numerals or may be any combination of characters having any length. Alternatively, or in addition to the PIN, the private key may be secured via biometric, voice recognition, or other security methods. The user's private key may be stored in a wallet file or other form of secure storage within the client device 101 or another device possessed by the user. The private key may be used to digitally sign the challenge received from server 102 in S107.

In S108, the digital signature, dynamic user ID 205, and the temporary authentication token may be transmitted from the client device 101 to the server 102. It should be appreciated that the dynamic user ID 205 may be transmitted within the authentication token 200 or separately to provide additional validation. In S109, the server 102 may read the temporary session ID 220 from the received temporary authentication token 200 and extract the associated and previously-transmitted challenge from session table 260. Alternatively, the challenge may be stored in a memory, such as a cache, or other data storage device within server 102 or externally available via a network. The server 102 may additionally retrieve a static user ID 251 from user table 250 using the dynamic user ID 205 in S110. The static user ID 251 may be used to also retrieve the user's public key 252. The static user 251 may be "assigned" to the public key 252 within the user table 250, such that for example, the static user ID 251 and the public key 252 are stored within the same row/column of user table 250, or such that the public key 252 is returned in response to a selection query using the static user ID 251. It should be appreciated that the user table 250 may be implemented using a variety of data storage structures and need not be represented as a table. The static user ID 251 may remain static, or fixed, with respect to the dynamic user ID 205 in user table 250 and may be uniquely assigned to the user operating the client device 101. In this way, the static user ID 251 may be used, for example, in logging the acts of the client device 101 within the system. This approach may be preferable to using the dynamic user ID 205 for logging purposes in order to avoid misrepresenting the acts of a single user as the acts of several different users. The static user ID 251 may be the same as an e-mail ID 253 for a user, as shown in user table 250.

Using the retrieved public key 252 and challenge, server 102 may verify the digital signature received from the client device in S111. Alternatively, or in addition, the client device 101 may engage in multi-factor authentication with server 102. For example, the user of client device 101 may receive an out-of-band (OOB) communication, such as an e-mail, SMS, or push notification that may be confirmed in addition to the digital signature verified in S111. In S112, with the digital signature verified, server 102 may generate a new, permanent session with a corresponding session ID 261, session type 262, and a new dynamic user ID 205. Server 102 may update the user table 250 and session table 260 to reflect that the new session ID 261 has been assigned to the new dynamic user ID 205. At this point, server 102 may invalidate or overwrite any previously-generated dynamic user ID(s) 205 for the client device 101. Accordingly, the newly-generated dynamic user ID 205 may be the only user ID for an associated client device 101 that will allow a successful authentication with server 102. Any attempts by client device 101 or any other device to authenticate using a prior dynamic user ID 205 may be rejected by server 102.

In S113, the server 102 may send the dynamic user ID 205 and the "real" authentication token 200 to the client device 101. As in the case of the temporary authentication token transmitted in S104, the "real" authentication token 200 may also be encrypted using the public key 252. The authentication token 200 may include the new session ID 220 generated in S112. As discussed previously, the dynamic user ID 205 may be transmitted within the authentication token 200 or separately to provide additional validation.

The client device 101, upon receiving the updated authentication token 200 and the dynamic user ID 205, may update the authentication token 200 with the new dynamic user ID 205 in S114. The client device 101 may subsequently use the authentication token 200, which contains the new dynamic user ID 205, during the next time the client device 101 attempts to authenticate with the server 102. Upon successfully authenticating with server 102, the server 102 may generate a new dynamic user ID 205, as previously described in connection with S112, and pass the updated authentication token 200 to client device 101, as previously described in connection with S113. In this way, a malicious actor may never know the user's dynamic user ID 205 credential and therefore, may not succeed in launching a DoS/DDoS attack or brute force attack against the user.

Various alterations and modifications of the disclosed subject matter are possible. For example, the user table 250 and session table 260 may be stored on server 102 or may be stored in a distributed manner across an array of servers or storage devices. The existing authentication solution may also be enhanced using cryptographic camouflage to protect the authentication token 200 from brute force attacks. Alternatively, or in addition, the server 102 may incorporate various techniques to camouflage the validity of a (dynamic) user ID. For example, the server 102 may not indicate that an invalid user ID has been entered, even when such is the case. In this way, a malicious actor may be misled into spending more time attempting to determine the correct password for an invalid account rather than attempting to determine a valid user ID.

Embodiments of the present subject matter may advantageously allow for a more secure method of authenticating a user than would be achievable using conventional techniques. For example, the present subject matter may reduce the burden on the user in that he or she need only remember the PIN in order to authenticate oneself to an authentication server. In this way, the disclosed subject matter may reduce friction in the authentication process. Passwords are not stored in the system and therefore, may not be vulnerable to breach. This is due in-part to the design of the authentication token, which stores the authentication token and dynamic user ID 205 and may only be accessible via the user's PIN. Additionally, embodiments disclosed herein may overcome the associated disadvantages appearing in conventional authentication systems, where a user may be burdened by remembering his or her user ID, password, and update each at frequent intervals. The described embodiments of the present subject matter previously discussed may overcome these disadvantages.

Embodiments of the presently disclosed subject matter may be implemented in and used with a variety of component and network architectures. The client device 101 and server 102 may be networked in a client-server arrangement or in a distributed network arrangement. Each of client device 101 and server 102 may be implemented as homogeneous data processing entities having static, local hardware and software. Alternatively, or in addition, client device 101 and server 102 may be implemented as cloud-based, virtualized data processing entities where computing resources may be collectively drawn from a shared pool of processors, storage devices, peripheral devices, servers, routers, and the like. The computing resources, such as processing, memory, and network bandwidth, may be dynamically allocated based on user demand.

FIG. 3 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
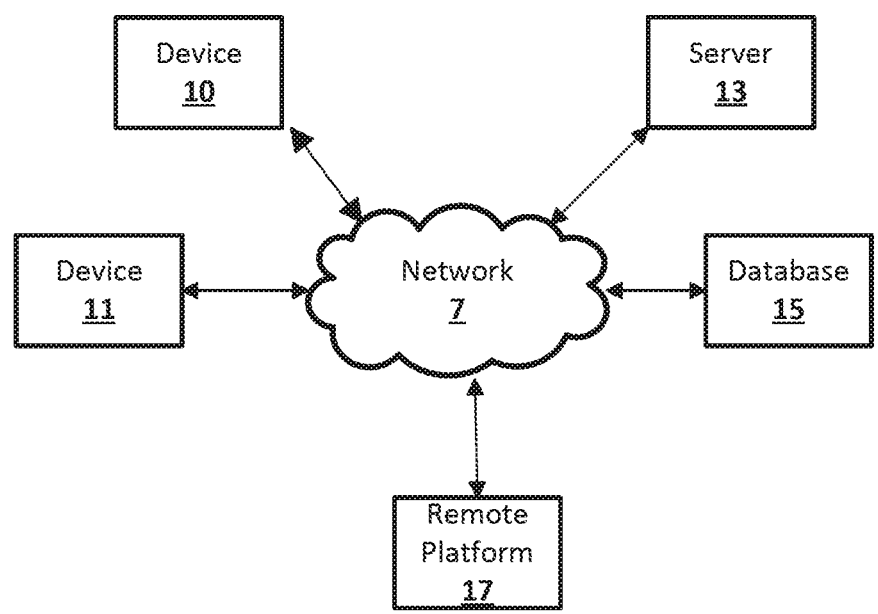
FIG. 4 shows a network configuration according to an embodiment of the disclosed subject matter.

FIG. 4 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 5:
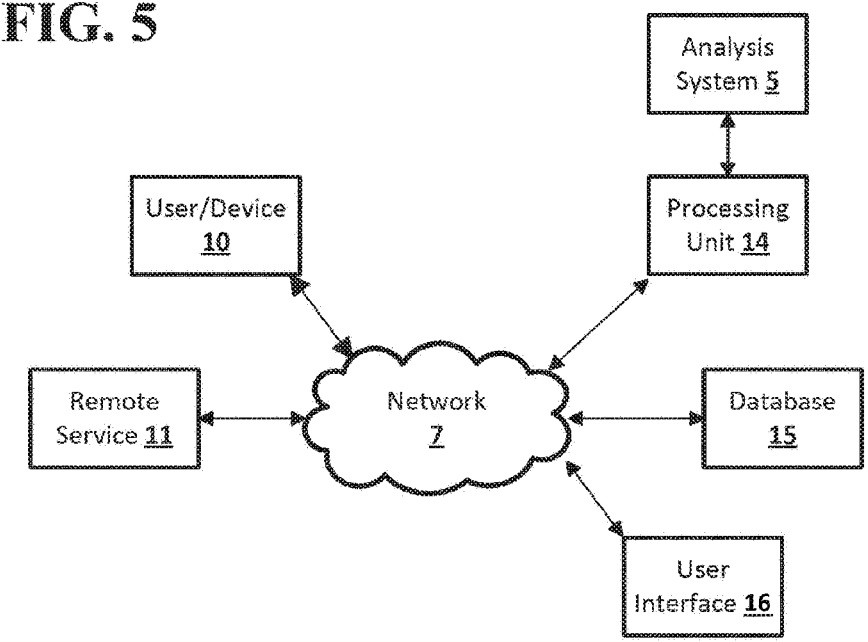
FIG. 5 shows an example network and system configuration according to an embodiment of the disclosed subject matter

FIG. 5 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 16. In some cases, the devices 10, 11 may communicate with a user-facing interface system 16, which may provide access to one or more other systems such as a database 15, a processing unit 14, or the like. For example, the user interface 16 may be a user-accessible web page that provides data from one or more other computer systems. The user interface 16 may provide different interfaces to different clients, such as where a human-readable web page is provided to a web browser client on a user device 10, and a computer-readable API or other interface is provided to a remote service client 11.

The user interface 16, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 16. In some arrangements, an analysis system 5 may provide back-end processing, such as where stored or acquired data is pre-processed by the analysis system 5 before delivery to the processing unit 14, database 15, and/or user interface 16. For example, a machine learning system 5 may provide various prediction models, data analysis, or the like to one or more other systems 14, 15 and 16.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of authenticating a client device with a server, the method comprising:
   receiving a first authentication request from a first client device;
   generating, in response to receiving the first authentication request, a first authentication token, the first authentication token including a first dynamic user ID and a first session ID;
   transmitting, to the first client device, the first authentication token being encrypted using a public key associated with the first client device;
   storing, based on transmitting the first authentication token to the first client device, the first dynamic user ID and the first session ID designated as a temporary session type;
   receiving, based on transmitting the encrypted first authentication token to the first client device, a digital signature based on a user entered PIN at the first client device and a second authentication token from the first client device, the second authentication token including the first dynamic user ID and the first session ID;
   verifying, using the public key associated with the first client device transmitted to the first client device, the digital signature based on the contents of the second authentication token;
   generating, based on verifying the digital signature, a third authentication token including a second dynamic user ID and a second session ID, the third authentication token being encrypted using the public key associated with the first client device;

transmitting, to the first client device, the third authentication token;

overwriting, based on transmitting the third authentication token to the first client device, the stored first dynamic user ID with the second dynamic user ID, and the stored first session ID with the second session ID designated as a permanent session type;

receiving the second dynamic user ID and the third authentication token from the first client device in a second authentication request occurring after the first authentication request; and authenticating the first client device using the third authentication token upon entry of the user entered PIN at the first client device.

2. The method of claim 1, wherein the first authentication request includes a fourth authentication token, the method further comprising:

extracting a second session ID from the fourth authentication token; and determining whether a valid session for the first client device exists based on the second session ID.

3. The method of claim 2, wherein the fourth authentication token contains a third dynamic user ID having a null or empty value.

4. The method of claim 1, wherein the first and second dynamic user ID, when generated, are uniquely assigned to a static user ID wherein no other static user ID may be assigned to the same dynamic user ID.

5. The method of claim 1, further comprising:

generating a third session ID that is assigned to the second dynamic user ID.

6. The method of claim 1, wherein the second dynamic user ID is transmitted within the third authentication token.

7. The method of claim 3, wherein the third dynamic user ID is transmitted separately from the third authentication token.

8. The method of claim 2, further comprising:

determining that a valid session for the first client device does not exist;

generating a challenge;

generating a third session ID; and transmitting the challenge to the client device.

9. The method of claim 1, further comprising:

after generating the second dynamic user ID, rejecting authentication of a second client device in response to receiving an authentication token containing the first dynamic user ID.

10. The method of claim 9, wherein the second client device is the first client device.

11. A non-transitory computer-readable medium storing a plurality of instructions which, when executed by a processor, perform a method comprising:

receiving a first authentication request from a first client device;

generating, in response to receiving the first authentication request, a first authentication token, the first authentication token including a first dynamic user ID and a first session ID;

transmitting, to the first client device, the first authentication token being encrypted using a public key associated with the first client device;

storing, based on transmitting the first authentication token to the first client device, the first dynamic user ID and the first session ID designated as a temporary session type;

receiving, based on transmitting the encrypted first authentication token to the first client device, a digital signature based on a user entered PIN at the first client device and a second authentication token from the first client device, the second authentication token including the first dynamic user ID and the first session ID;

verifying, using the public key associated with the first client device transmitted to the first client device, the digital signature based on the contents of the second authentication token;

generating, based on verifying the digital signature, a third authentication token including a second dynamic user ID and a second session ID, the third authentication token being encrypted using the public key associated with the first client device;

transmitting, to the first client device, the third authentication token;

overwriting, based on transmitting the third authentication token to the first client device, the stored first dynamic user ID with the second dynamic user ID, and the stored first session ID with the second session ID designated as a permanent session type;

receiving the second dynamic user ID and the third authentication token from the first client device in a second authentication request occurring after the first authentication request; and authenticating the first client device using the third authentication token upon correct entry of the user entered PIN at the first client device.

12. The medium of claim 11, wherein the first authentication request includes a fourth authentication token, the method further comprising:

extracting a second session ID from the fourth authentication token; and determining whether a valid session for the first client device exists based on the second session ID.

13. The medium of claim 12, wherein the fourth authentication token contains a third dynamic user ID having a null or empty value.

14. The method of claim 11, wherein the first and second dynamic user ID, when generated, are uniquely assigned to a static user ID wherein no other static user ID may be assigned to the same dynamic user ID.

15. The method of claim 11, further comprising:

generating a third session ID that is assigned to the second dynamic user ID.

16. The method of claim 11, wherein the second dynamic user ID is transmitted within the third authentication token.

17. The method of claim 13, wherein the third dynamic user ID is transmitted separately from the third authentication token.

18. The method of claim 12, further comprising:

determining that a valid session for the first client device does not exist;

generating a challenge;

generating a third session ID; and transmitting the challenge to the client device.

19. The method of claim 11, further comprising:

after generating the second dynamic user ID, rejecting authentication of a second client device in response to receiving an authentication token containing the first dynamic user ID.

20. The method of claim 19, wherein the second client device is the first client device.

* * * * *